United States Patent
Liedholm et al.

(10) Patent No.: US 10,171,643 B2
(45) Date of Patent: Jan. 1, 2019

(54) DIRECTING AUDIO OUTPUT BASED ON GESTURES

(71) Applicant: SONY CORPORATION, Tokyo (JP)

(72) Inventors: Johan Liedholm, Hjarup (SE); Johan Gulliksson, Bjarred (SE)

(73) Assignees: SONY CORPORATION, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 397 days.

(21) Appl. No.: 14/402,281

(22) PCT Filed: Jan. 22, 2014

(86) PCT No.: PCT/IB2014/000055
§ 371 (c)(1),
(2) Date: Nov. 19, 2014

(87) PCT Pub. No.: WO2015/110850
PCT Pub. Date: Jul. 30, 2015

(65) Prior Publication Data
US 2015/0347086 A1    Dec. 3, 2015

(51) Int. Cl.
*H04M 1/725* (2006.01)
*H04W 24/08* (2009.01)
(Continued)

(52) U.S. Cl.
CPC .......... *H04M 1/7253* (2013.01); *G06F 3/002* (2013.01); *G06F 3/01* (2013.01); *G06F 3/017* (2013.01);
(Continued)

(58) Field of Classification Search
CPC .......... G06F 3/165; G06F 3/017; G06F 3/162; G06F 3/016; H04M 1/6058; H04M 1/6041; H04B 3/00
(Continued)

(56) References Cited

U.S. PATENT DOCUMENTS 9,088,969 B2 * 7/2015 Park .................... H04M 1/7253
9,374,448 B2 * 6/2016 Miller ................. H04M 1/6041
(Continued)

FOREIGN PATENT DOCUMENTS

WO    2013098262 A1    7/2013

OTHER PUBLICATIONS

International Search Report dated Sep. 25, 2014, issued in corresponding PCT application PCT/IB2014/000055, 12 pages.

*Primary Examiner* — Joy M Weber
(74) *Attorney, Agent, or Firm* — Tucker Ellis LLP

(57) ABSTRACT

Device and method for directing audio input and output between a plurality of electronic devices. Event records are stored in memory and each event record records a specific combination of states relating to a first device or a second device and are associated with an action. Each action specifies a direction of audio input and output. States of the first and second devices are monitored. Changes to states are detected. Based on specific combination of states, one of the event records associated with the specific combination of states is identified. The action associated with the identified event record is performed and audio input and output between the electronic devices is directed in accordance with the associated action.

22 Claims, 9 Drawing Sheets

(51) Int. Cl.
  *G06F 13/10* (2006.01)
  *G06F 3/00* (2006.01)
  *G06F 3/01* (2006.01)
  *G06F 3/16* (2006.01)
  *H04M 1/60* (2006.01)

(52) U.S. Cl.
  CPC .............. *G06F 3/165* (2013.01); *G06F 3/167* (2013.01); *G06F 13/102* (2013.01); *H04M 1/6041* (2013.01); *H04M 1/72569* (2013.01); *H04M 1/72597* (2013.01); *H04W 24/08* (2013.01)

(58) Field of Classification Search
  USPC .................................................. 715/728, 863
  See application file for complete search history.

(56) References Cited

U.S. PATENT DOCUMENTS

| | | | |
|---|---|---|---|
| 2007/0127704 A1* | 6/2007 | Marti | H04M 1/2473 379/373.01 |
| 2009/0003620 A1 | 1/2009 | McKillop et al. | |
| 2010/0046731 A1* | 2/2010 | Gisby | H04M 3/436 379/211.01 |
| 2010/0199232 A1* | 8/2010 | Mistry | G06F 1/163 715/863 |
| 2011/0130168 A1* | 6/2011 | Vendrow | H04M 1/57 455/556.1 |
| 2014/0205076 A1* | 7/2014 | Kumar | H04M 3/42042 379/142.01 |
| 2014/0235253 A1* | 8/2014 | Li | H04L 65/1053 455/445 |

\* cited by examiner

EVENT TABLE 600

602-1

| RECORD NO. 606-1 | DEVICE 608-1 | RELATIVE LOCATION 610-1 | AMBIENT NOISE 612-1 | PAIRED DEVICES 622-1 | ACTION 624-1 |
|---|---|---|---|---|---|
| 1 | D1 | N/A | N/A | D1 & D2 | TO D1 |
| DIRECTION 614-1 | GESTURE 616-1 | CALL TYPE 618-1 | CONTACT TYPE 620-1 | | |
| TOWARD | HOLDING | INCOMING | PUBLIC | | |

602-2

| RECORD NO. 606-2 | DEVICE 608-2 | RELATIVE LOCATION 610-2 | AMBIENT NOISE 612-2 | PAIRED DEVICES 622-2 | ACTION 624-2 |
|---|---|---|---|---|---|
| 2 | D1 | N/A | N/A | D1 & D2 | TO D2 |
| DIRECTION 614-2 | GESTURE 616-2 | CALL TYPE 618-2 | CONTACT TYPE 620-2 | | |
| AWAY | HOLDING | INCOMING | PUBLIC | | |

602-3

| RECORD NO. 606-3 | DEVICE 608-3 | RELATIVE LOCATION 610-3 | AMBIENT NOISE 612-3 | PAIRED DEVICES 622-3 | ACTION 624-3 |
|---|---|---|---|---|---|
| 3 | D1 | CAR:D3 | NONE | D1 & D3 or D2 & D3 | DECOUPLE FROM D3; TO D1 |
| DIRECTION 614-3 | GESTURE 616-3 | CALL TYPE 618-3 | CONTACT TYPE 620-3 | | |
| TOWARD | HOLDING | INCOMING | PRIVATE | | |

FIG. 6B

EVENT TABLE 600

602-4

| RECORD NO. 606-1 | DEVICE 608-1 | RELATIVE LOCATION 610-1 | AMBIENT NOISE 612-1 | PAIRED DEVICES 622-1 | ACTION 624-1 |
|---|---|---|---|---|---|
| 4 | D1 | CAR:D3 | NONE | NONE | PAIR WITH D3; TO D3 |
| DIRECTION 614-1 | GESTURE 616-1 | CALL TYPE 618-1 | CONTACT TYPE 620-1 | | |
| AWAY | HOLD | INCOMING | PUBLIC | | |

602-5

| RECORD NO. 606-2 | DEVICE 608-2 | RELATIVE LOCATION 610-2 | AMBIENT NOISE 612-2 | PAIRED DEVICES 622-2 | ACTION 624-2 |
|---|---|---|---|---|---|
| 5 | D2 | CAR:D3 | HIGH | D1 & D2 | PAIR WITH D3; TO D3 |
| DIRECTION 614-2 | GESTURE 616-2 | CALL TYPE 618-2 | CONTACT TYPE 620-2 | | |
| AWAY | HOLD | INCOMING | PUBLIC | | |

602-6

| RECORD NO. 606-3 | DEVICE 608-3 | RELATIVE LOCATION 610-3 | AMBIENT NOISE 612-3 | PAIRED DEVICES 622-3 | ACTION 624-3 |
|---|---|---|---|---|---|
| 6 | D1 | N/A | NONE | N/A | COMPLETE DIALING; TO D1 |
| DIRECTION 614-3 | GESTURE 616-3 | CALL TYPE 618-3 | CONTACT TYPE 620-3 | | |
| N/A | DIAL | OUTGOING | N/A | | |

DIRECTING AUDIO OUTPUT BASED ON GESTURES

BACKGROUND

Today's smart phones can automatically perform tasks that, in the past, the users performed manually. For example, a smart phone may include a voice recognition system that, based on a voice command, automates a web search, sets a reminder, sends a message, etc. In another example, a smart phone may receive input from user interfaces to determine whether the smart phone is being used. If the smart phone is idle, the smart phone may automatically turn off its screen to save energy.

SUMMARY

According to one aspect, a first device may include a memory to store instructions and a processor to execute the instructions to: determine whether there is an incoming call to the first device or an outbound call from the first device. The processor may be further configured to execute the instructions to monitor at least one of: user input to the first device; motion of a second device; or motion of the first device. The processor may be still further configured to: identify a user's gesture based on a result of the monitoring and in response to determining that there is an incoming call or an outbound call; and redirect audio input and output at a first one of input/output (I/O) devices to a second one of the I/O devices based on the gesture. The I/O devices may include the first device and the second device.

Additionally, the first device may includes one of: a smart phone; a tablet computer; a computer; a laptop computer. The second device may include one or more of: a headset; speakers; a microphone; or a head-mounted display.

Additionally, when the processor monitors the user input, the processor may be further configured to detect initial digits of a phone number being input to the first device.

Additionally, the first device may further include a component that includes at least one of: an accelerometer, a camera, a proximity sensor, a compass, and a gyroscope. When the processor monitors the motion of the first device, the processor may receive and process output of the component.

Additionally, the second device further comprises a component that includes at least one of: an accelerometer; a camera, a proximity sensor; a sensor for determining whether the second device is being worn on a user's head; and a gyroscope. When the processor monitors the motion of the second device, the processor may receive and process output of the component.

Additionally, the second device may be coupled to the first device via a BLUETOOTH communication link.

Additionally, the gesture may include moving the second device to the head of a user. When the processor redirects the audio input and output, the processor may direct the audio input and output to the second device.

Additionally, the gesture may include moving the first device to the head of the user. When the processor redirects the audio input and output, the processor may direct the audio input and output to the first device.

Additionally, the gesture may include moving the first device away from the head of the user. When the processor redirects audio input and output, the processor may redirect the audio input and output to the second device.

Additionally, the gesture may include moving the first device toward the head of the user, and he I/O devices may further include a third device paired with the first device. When the processor redirects the audio input and output, the processor may: cause the first device to decouple from the third device and direct the audio input and output to the first device.

Additionally, the gesture may include moving the second device toward the head of the user, and the I/O devices may further include a third device paired with the first device. When the processor redirects the audio input and output, the processor may: causes the first device to decouple from the third device; pair the first device with the second device; and direct the audio input and output to the second device.

Additionally, the gesture may include moving the second device away the head of the user, and the first device may be paired with the second device. The I/O devices may further include a third device. When the processor redirects the audio input and output, the processor may: causes the first device to decouple from the second device; pair the first device with the third device; and direct the audio input and output to the third device.

Additionally, the gesture may include dialing a portion of a phone number. When the processor redirects the audio input and output, the processor may complete the dialing of the phone number and initiate a call based on the dialed number.

According to another aspect, a method may include determining whether there is an incoming call to a first device or an outbound call from the first device. The method may also include monitoring at least one of: user input to the first device; motion of a second device; or motion of the first device. The method may further include identifying a user's gesture based on a result of the monitoring and in response to determining that there is an incoming call or an outbound call; and redirecting audio input and output, of the first device, at a first one of input/output (I/O) devices to a second one of the I/O devices based on the gesture. The I/O devices may include the first device and the second device.

Additionally, the gesture may include moving the second device to the head of a user. Redirecting the audio input and output may include redirecting the audio input and output to the second device.

Additionally, the gesture may include moving the first device to the head of the user. Redirecting the audio input and output may include redirecting the audio input and output to the first device.

Additionally, the gesture may include moving the first device away from the head of the user. Redirecting the audio input and output may include redirecting the audio input and output to the second device.

Additionally, the gesture may include moving the first device toward the head of the user. Redirecting the audio input and output may include: causing the first device to decouple from a third device; and directing the audio input and output to the first device.

Additionally, the gesture may include moving the second device toward the head of the user. Redirecting the audio input and output may include: causing the first device to decouple from a third device; pairing the first device with the second device; and directing the audio input and output to the second device.

Additionally, the gesture may include moving the second device away the head of the user, and the first device may be paired with the second device. Redirecting the audio signal may include: causing the first device to decouple from the second device; paring the first device with a third device; and directing the audio input and output to the third device.

Additionally, the gesture may include dialing a portion of a phone number. Redirecting the audio input and output may include: completing the dialing of the phone number; and initiating a call based on the dialed number.

According to yet another aspect, a tangible computer-readable storage device may include computer executable instructions. When executed by a processor, the instructions may cause the processor to determine whether there is an incoming call to a first device or an outbound call from the first device. When executed by the processor, the instructions may also cause the processor to monitor at least one of: user input to the first device, motion of a second device; or motion of the first device. When executed by the processor, the instructions may further cause the processor to: identify a user's gesture based on a result of the monitoring and in response to determining that there is an incoming call or an outbound call; and redirect audio input and output at a first one of input/output (I/O) devices to a second one of the I/O devices based on the gesture. The I/O devices may include the first device and the second device.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIGS. 6A and 6B illustrate an exemplary table of events;

DETAILED DESCRIPTION

The following detailed description refers to the accompanying drawings. The same reference numbers in different drawings may identify the same or similar elements.

As used herein, the term "pairing" refers to two devices agreeing to communicate with one another based on a communication protocol or technology. For example, two BLUETOOTH devices are paired (or "BLUETOOTH paired") when the devices agree or are ready to communicate with each other. Conversely, as used herein, the term "un-pairing" refers to two paired devices becoming no longer paired. Furthermore, depending on the context, the terms "decouple," or "decoupling" are used synonymously with "un-pair" or "un-pairing," respectively.

As used herein, the term "headset" may refer to: a pair of headphones; a combination of headphones and a microphone attached thereto; a combination of a headphone, microphone, and an optical head-mounted display (e.g., display glasses, mirrors, waveguides, etc.); etc. Also as used herein, depending on the context, the term "headphones" may be used synonymously with the term "headset."

In addition, as used herein, the phrase "redirecting audio input and/or output" to a device may refer to causing the device to provide the audio input and/or output and causing other devices not to provide the audio input/output. The phrase "redirecting audio input and/or output" does not refer to aiming a sound wave to/from the device.

In the following, a user device may detect a user's gesture or motion. If the gesture/motion indicates that the user is about to use a peripheral device (e.g., headset), the user device itself, or another device, the user device may direct its audio input/output to the device about to be used.

Figure 1:
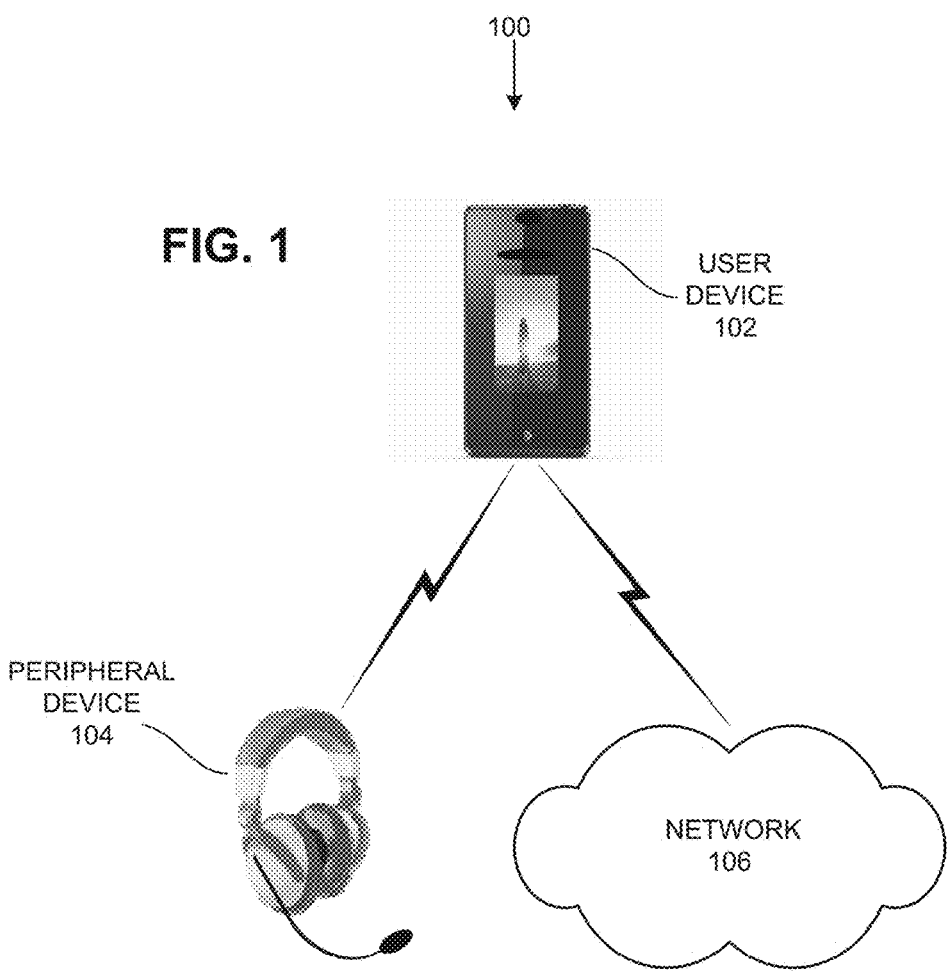
FIG. 1 illustrates an exemplary environment in which concepts described herein may be implemented.

FIG. 1 illustrates an environment 100 in which concepts described herein may be implemented. As shown, environment 100 may included user device 102, peripheral device 104, and network 106.

User device 102 may include any of the following devices that have the ability to, or are adapted to, operate as a phone and to direct its audio and/or video output: a smart phone; or a cell phone; or a mobile telephone. User device 102 may also include a device with a Voice-over-Internet Protocol (VoIP) capability, such as a personal computer, a tablet computer, a gaming console, a music-playing device, a laptop computer; a personal digital assistant (PDA); a digital camera; or another type of computational or communication device. User device 102 may establish a call session with another device over network 106.

User device 102 may detect the user's gesture based on its own motion, motion of another device (e.g., peripheral device 104), and/or user input. The motion may be caused by a gesture of the user holding user device 102 and/or peripheral device 104. When the detected gesture, together with other information collected by sensors on user device 102 or peripheral device 104, indicates that the user is about to use user device 102 or peripheral device 104 (e.g., move user device 102/peripheral device 104 toward the user's head, an incoming telephone call is detected, etc.), user device 102 may reconfigure its audio input and output (I/O), such that user device 102 receives/sends the audio I/O to the device about to be used.

In other implementations, when the detected gesture, together with other information collected by sensors on user device 102 or peripheral device 104, indicates that the user is about to stop using user device 102 or peripheral device 104 (e.g., move user device 102/peripheral device 104 away from the user's head), user device 102 may reconfigure its audio input and output, such that user device 102 reconfigures the audio I/O away from a device associated with the gesture.

Peripheral device 104 may include a headset, a headphone, microphone, projection glasses, etc., that is coupled to user device 102 via a cable or a cord, or, alternatively, paired with user device 102 over a wireless link. In one implementation, peripheral device 104 and user device 102 may be paired via a BLUETOOTH communication link.

Peripheral device 104 may sense its own movement and/or location, and generate movement/location information. Peripheral device 104 may transmit the movement/location information to user device 102.

Network 106 may include a cellular network, public switched telephone network (PSTN), local area network (LAN), wide area network (WAN), a wireless LAN, metropolitan area network (MAN), personal area network (PAN), Internet Protocol (IP) based High Speed Packet Access (HSPA) network, evolved HSPA network, Long Term Evolution (LTE) network, intranet, the Internet, satellite-based network, a fiber-optic network (e.g., passive optical networks (PONs)), an ad hoc network, any other network, or a combination of networks. Devices that are shown in FIG. 1 may connect to network 106 via wireless, wired, or optical communication links.

The number and types of devices in FIG. 1 are exemplary. Depending on the implementation, environment 100 may include additional, fewer, different, or a different arrangement of components and devices than those illustrated in FIG. 1. For example, environment 100 may include thousands, millions, etc., of user devices 102 and peripherals 104. In another example, network 100 may include other types of devices and components, such as routers, switches, bridges, gateways, etc.

Figure 2:
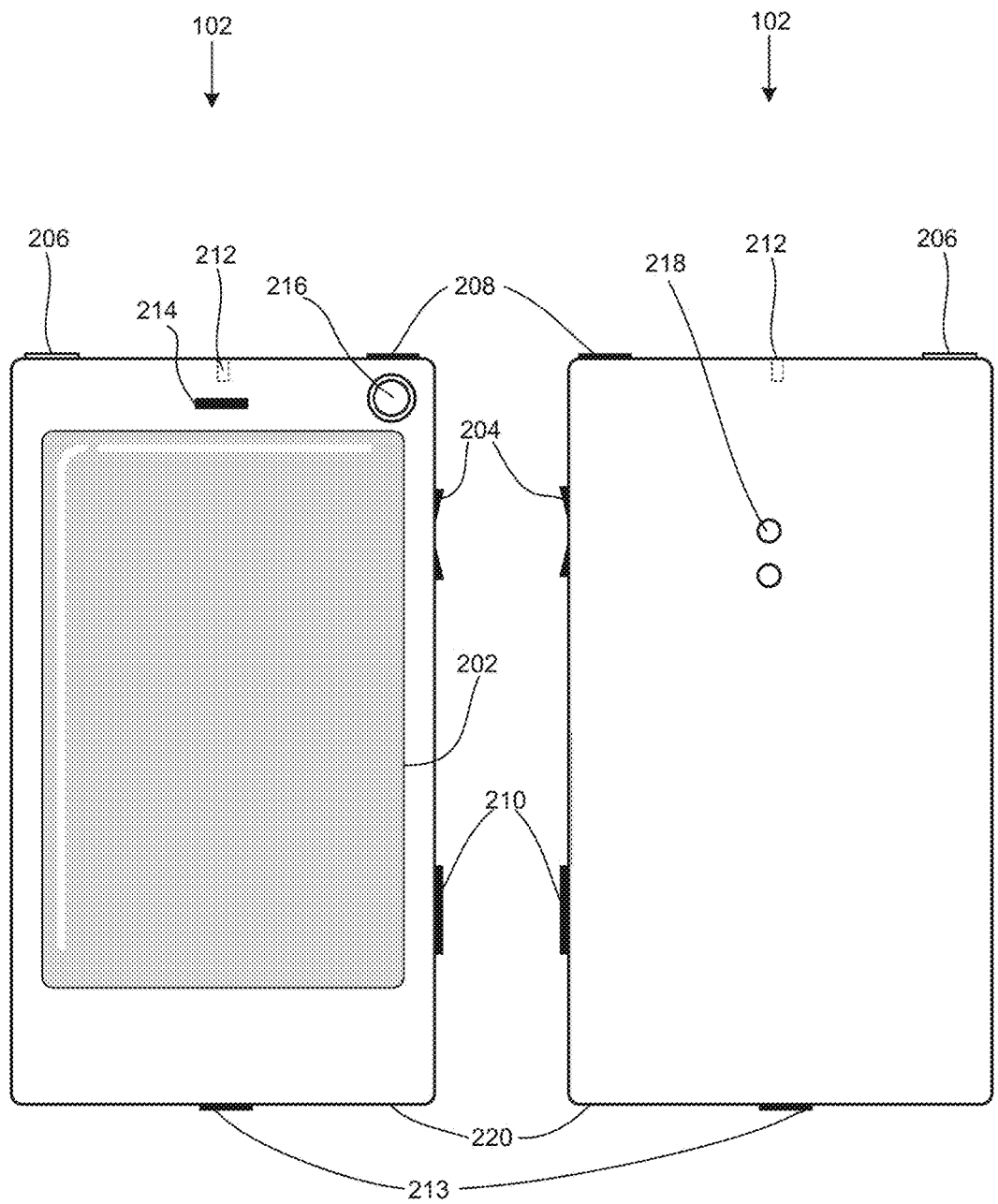
FIGS. 2A and 2B are front and rear views of an exemplary user device of FIG. 1.

FIGS. 2A and 2B are front and rear views of one implementation of user device 102. As shown in FIGS. 2A and 2B, user device 102 may include a display 202, volume rocker 204, awake/sleep button 206, a data/charging port 208, camera button 210, speaker jack port 212, microphone/speaker 213/214, camera 216, sensors 218, and housing 220. Depending on the implementation, user device 102 may include additional, fewer, different, or different arrangement of components than those illustrated in FIGS. 2A and 2B.

Display 202 may provide visual information to the user. Examples of display 202 may include a liquid crystal display (LCD), a plasma display panel (PDP), a field emission display (FED), a thin film transistor (TFT) display, etc. In some implementations, display 202 may also include a touch screen that can sense contacting a human body part (e.g., finger) or an object (e.g., stylus) via capacitive sensing, surface acoustic wave sensing, resistive sensing, optical sensing, pressure sensing, infrared sensing, and/or another type of sensing technology. The touch screen may be a single-touch or multi-touch screen.

Volume rocker 204 may permit a user to increase or decrease speaker volume. Awake/sleep button 206 may put user device 102 into or out of the power-savings mode. In some implementations, awake/sleep button 206 may be replaced by an on/off button that turns user device 102 on or off.

Data/charging port 208 may allow user device 102 to communicate over, for example, a universal serial bus (USB), to another device. In some implementations, data/charging port 208 may also allow user device 102 to receive power, either from an adapter (e.g., an alternating current (AC) to direct current (DC) converter) or from another device (e.g., computer). Camera button 210 may send a signal to camera 216 to capture an image (e.g., cause a shutter to open/close).

Speaker jack port 212 may include a plug-in into which one may insert a speaker jack, so that signals from user device 102 can drive the speakers, to which speaker wires run from the speaker jack. In some implementations, a pair of headphones (or ear buds) whose speaker jack is inserted into speaker jack port 212 may be capable of sensing its own motion, it location, and whether the headphones/earphones/ear buds are currently being used (e.g., whether the headphones are on the user's head, whether the ear buds are inserted into the user's ears, etc.). The headphones/earphones/ear buds may relay information obtained from the sensing to user device 102 via speaker jack port 212.

Microphone/speaker 213/214 may receive audible information and/or sounds from the user and from the surroundings. In addition, microphone/speaker 213/214 may provide audible information from user device 102 to the user. Whether user device 102 uses microphone/speaker 213/214 depends on its dynamic configuration of its audio I/O. In one configuration, user device 102 may receives its audio input from microphone 213 and send its audio output to speaker 214. In a different configuration, user device 102 may receive its audio input from a peripheral (e.g., headset) and sends its audio output to the peripheral, over either a wired or wireless communication link.

Front camera 216 may enable the user to view, capture, store, and process images of a subject in/at front of camera 216. In some implementations, a software application installed on user device 102 may receive an image of the user's head, face, mouth, or ears via front camera 216. User device 102 may use the information in determining whether the user is using/handling user device 102.

Sensors 218 may detect the distance between user device 102 and another object. For example, sensors 218 may determine proximity of user device 102 to user's body part, such as user's head. Depending on the implementation, sensors 218 may include an infrared sensor, light sensor and/or ultrasound sensor.

Housing 220 may provide a casing for components of device 102 and may protect the components from outside elements.

Depending on the implementation, user device 102 may include additional, fewer, different, or a different arrangement of components than those illustrated in FIGS. 2A and 2B. For example, user device 102 may include additional sensors to collect and provide, to user device 102, information pertaining to user device 102 (e.g., lighting conditions) and/or information that is used to aid a user in capturing images (e.g., for providing information for auto-focusing). Furthermore, although not illustrated, user device 102 may include additional components, such as light bulbs/sources, emitting diodes (LEDs), etc.

Figure 3:
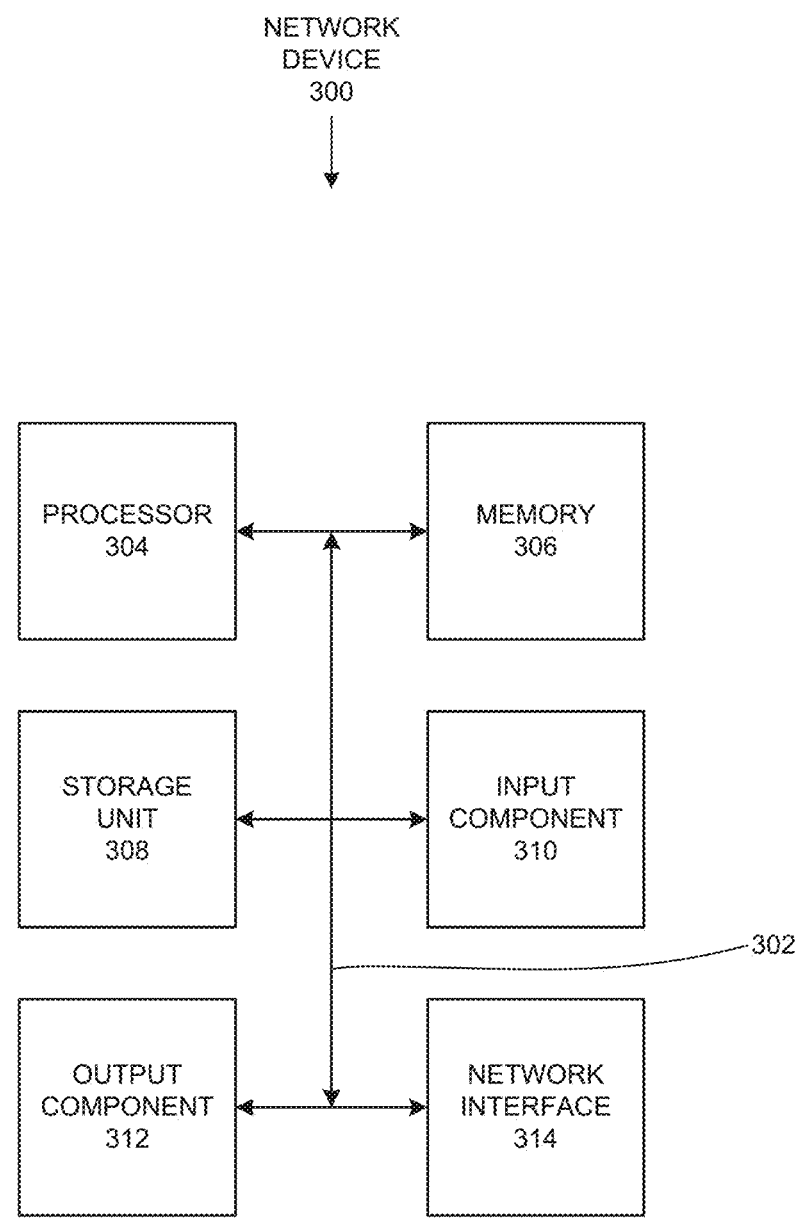
FIG. 3 is a block diagram of exemplary components of a network device of FIG. 1.

FIG. 3 is a block diagram of network device 300. Network device 300 may represent user device 102 or peripheral device 104. As shown, network device 300 may include a communication path 302, processor 304, memory 306, storage unit 308, input component 310, output component 312, and network interface 314. In different implementations, network device 300 may include additional, fewer, or different components than the ones illustrated in FIG. 3.

Communication path 302 may provide an interface through which components of network device 300 can communicate with one another. Processor 304 may include a processor, a microprocessor, an Application Specific Integrated Circuit (ASIC), a Field Programmable Gate Array (FPGA), and/or other processing logic capable of controlling network device 300. Memory 306 may include static memory, such as read only memory (ROM), and/or dynamic memory, such as random access memory (RAM), or onboard cache, for storing data and machine-readable instructions.

Storage unit 308 may include a magnetic and/or optical storage/recording medium. In some embodiments, storage unit 308 may be mounted under a directory tree or may be mapped to a drive. Depending on the context, the term "medium," "memory," "storage," "storage device," "storage medium," and/or "storage unit" may be used interchangeably. For example, a "computer readable medium," "computer-readable storage device" and "computer readable storage medium" may refer to both a memory and/or storage device.

Input component 310 may permit a user to input information to network device 300. Input component 310 may include, for example, a keyboard, a keypad, a mouse, a pen, a microphone, a camera, a touch screen, voice recognition and/or biometric mechanisms, sensors, etc. Output component 312 may output information to the user. Output component 312 may include, for example, a display, a printer, a speaker, etc.

Network interface 314 may include a transceiver that enables user device 102 to communicate with other devices and/or systems. For example, network interface 314 may include mechanisms for communicating via a network, such as the Internet, a mobile network, a terrestrial wireless network (e.g., a WLAN), a satellite-based network, a personal area network (PAN), a WPAN, etc. Additionally or alternatively, network interface 314 may include a modem, an Ethernet interface to a LAN, and/or an interface/connection for connecting network device 300 to other devices (e.g., a BLUETOOTH interface).

Network device 300 may perform the operations described herein in response to processor 304 executing software instructions stored in a non-transient computer-readable medium, such as memory 306 or storage unit 308. The software instructions may be read into memory 306 from another computer-readable medium or from another device via network interface 314. The software instructions stored in memory 306 or storage unit 308, when executed by processor 304, may cause processor 204 to perform processes, functions, and/or operations that are described herein.

Figure 4:
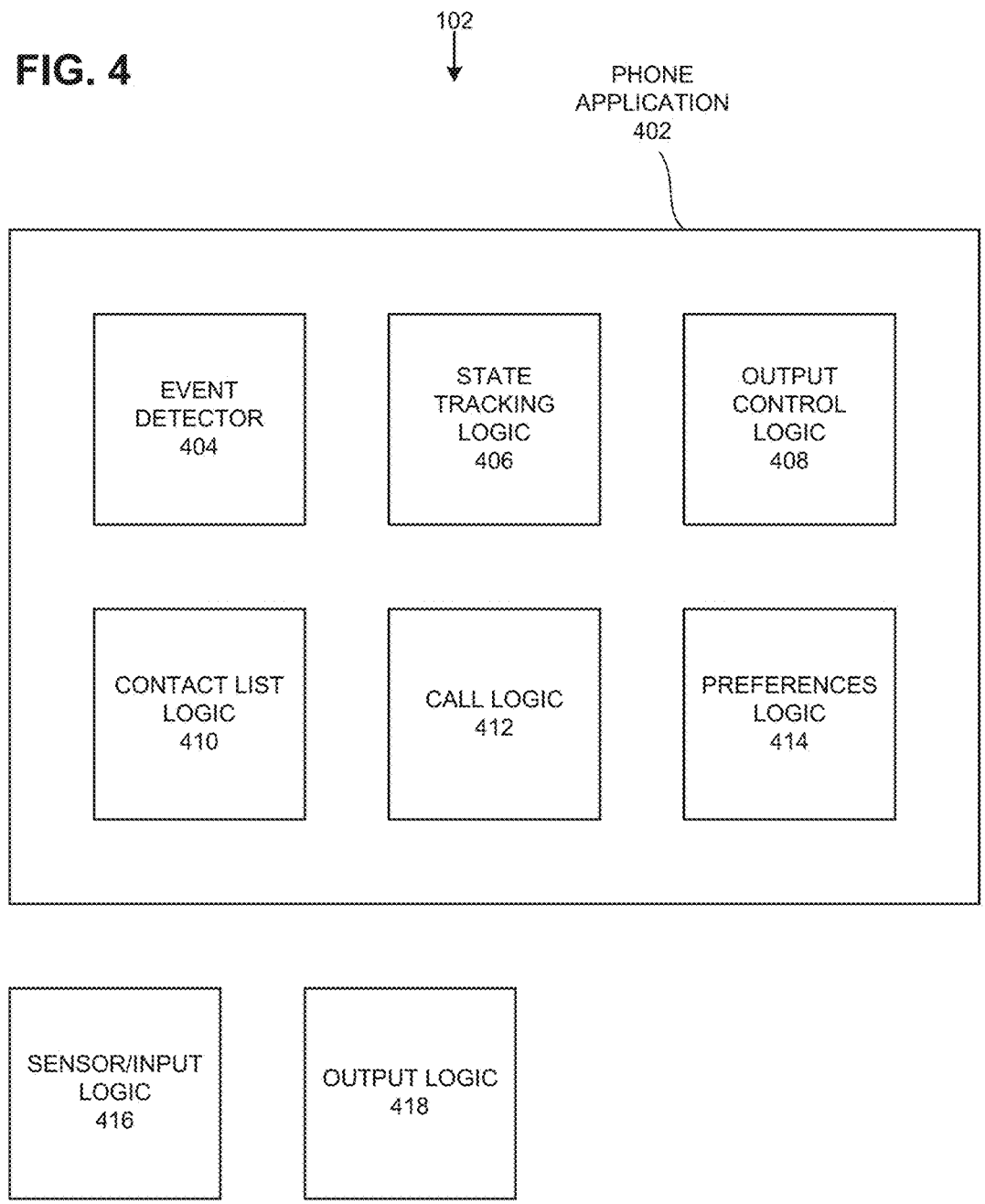
FIG. 4 is a block diagram of exemplary functional components of the user device of FIG. 1.

FIG. 4 is a block diagram of exemplary functional components of user device 102. As shown, user device 102 may include: a phone application 402, which in turn may include event detector 404, state tracking logic 406, output control logic 408, contact list logic 410, call logic 412, and preferences logic 414. User device 102 may also include sensor logic 416, and output logic 418.

Event detector 402 may detect change in one or more states of user device (e.g., a specific combination of states) that cause user device 102 to configure its audio I/O. When event detector 404 detects changes in states, event detector 404 may notify output control logic 408 of the occurrence(s). In some implementations, event detector 402 may be configurable to detect a specific combinations of state changes (e.g., detect a change in state regarding a call, change in a device's proximity to user's head, etc.).

State tracking logic 406 may track/monitor states of different components of user device 102 and/or peripheral device 104. The states may include, for example, active/inactive state (whether user device 102 is actively being used or not), call state (whether a call is ongoing or is being initiated), location (whether device 102/104 is inside a car, home, etc.), proximity state (e.g., whether device 102/104 is close to the user's head), etc.

To monitor/track states, state tracking logic 406 may receive the output of sensor/input logic 416 and monitor call logic 412. For example, state tracking logic 406 may receive the output of a compass, a gyroscope and/or accelerometer in device 102/104, a camera assembly in user device 102, or an infrared sensor in device 102/104, to detect whether device 102/104 has moved close to the user's head (e.g., within a certain distance of the user's head). In another example, state tracking logic 406 may simply detect an incoming call and the motion of user device 102, based on whether the acceleration and distance moved are greater than a threshold acceleration and a threshold distance, respectively. State tracking logic 406 may notify event detector 404 of the changes in states of different components of device 102/104.

Output control logic 408 may receive, from event detector 404, notifications/calls indicating an occurrence of an event. In accordance with the notification, output control logic 408 may configure the audio I/O of user device 102. For example, assume that output control logic 408 receives a notification, from event detector 404, that a user moved peripheral device 104 to the user's head and began dialing a number. In such an instance, output control logic 408 may direct its audio I/O to peripheral device 104. Consequently, user device 102 may receive its audio input from the microphone of peripheral device 104 and not from its own microphone (e.g., microphone 213). User device 102 may also direct its output to the speakers on peripheral device 104, and not to speakers 214.

Contact list logic 410 may store information for contacting a person, an organization, etc., based on user input. In addition, contact list logic 410 may access the contact information.

In one implementation, state tracking logic 406 or output control logic 408 may request contact list logic 410 to provide information. For example, state tracking logic 406 or output control logic 408 may request contact list logic 410 to look up the initial N-digits of a phone number and retrieve contact information associated with the number. State tracking logic 406 may use the contact information, for example, to determine whether the contact is "private" (e.g., a friend or relative) or "public" (e.g., business associate), assuming that the contact information differentiates "private" and "public" contacts. In another example, assume that output control logic 408 obtains five starting digits, of a phone number, that the user has input to user device 102 via sensor/input logic 416, and provides the digits to contact list logic 410. When contact list logic 410 retrieves the corresponding contact information, which includes the contact's full phone number, output control logic 408 may signal to the user that user device 102 will complete the dialing for the user. User device 102 may then complete the dialing and initiate the call on behalf of the user.

Call logic 412 may place a call to another device in network 106 and/or receive a call from such a device. When call logic 412 receives a call, not only does call logic 412 perform routine tasks that are associated with handling incoming calls, but may also notify state tracking logic 406 that there is an incoming call or that a call session has been established. Similarly, when call logic 412 places a call, not only does call logic 412 perform routine tasks that are associated with placing the call, but also notifies state tracking logic 406 that there is an outgoing call or that a call session has been established. Call logic 412 may also notify state tracking logic 406 when a call terminates.

Preferences logic 414 may receive user preferences for configuring call logic 412 and output control logic 408 and modify the configuration of call logic 412 and/or output control logic 408 based on the user input. For example, preferences logic 414 may allow the user to place user device 102 in a "vibrate mode" instead of "ringtone mode." In another example, preferences logic 414 may allow a user to direct all audio I/O of user device 102 to an automobile's speakers/microphone via a BLUETOOTH communication link when the user and user device 102 are in the automobile.

Sensor/input logic 416 may receive input from hardware components of user device 102 and provide information in the input to other components of user device 102. For example, sensor/input logic 416 may obtain the output of a compass, a gyroscope and/or accelerometer in user device 102, determine the movement of user device 102 based on the output of the accelerometer, gyroscope, and/or gyroscope, and relay information describing the movement to state tracking logic 406. In another example, sensor/input logic 416 may obtain images from a camera in user device 102 (e.g., front camera 216) and forward the images to state tracking logic 406.

Output logic 418 may relay information from components in user device 102 to output component 312 of user device 102, to peripheral device 104, and/or another device. For example, output logic 418 may relay audio information from a music player on user device 102 to speakers on user device 102 or on peripheral device 104. As described above, output control logic 408 may modify the configuration of output logic 418, such that audio I/O is directed to microphone/speakers on user device 102, on peripheral device 104, or on another device (e.g., automobile) in accordance with events detected by event detector 404.

Depending on the implementation, user device 102 may include additional, fewer, different, and/or a different arrangement of components than those illustrated in FIG. 4. For example, in one implementation, two or more components may perform the functions of a single component illustrated in FIG. 4. Conversely, in another implementation, a single component may perform functions of two or more components in FIG. 4. Furthermore, although not illustrated in FIG. 4, user device 102 may include other components, such as a communication component (e.g., a Transport Control Protocol IP stack), a digital filter, a signal processor, an operating system, device drivers, applications, etc.

Figure 5:
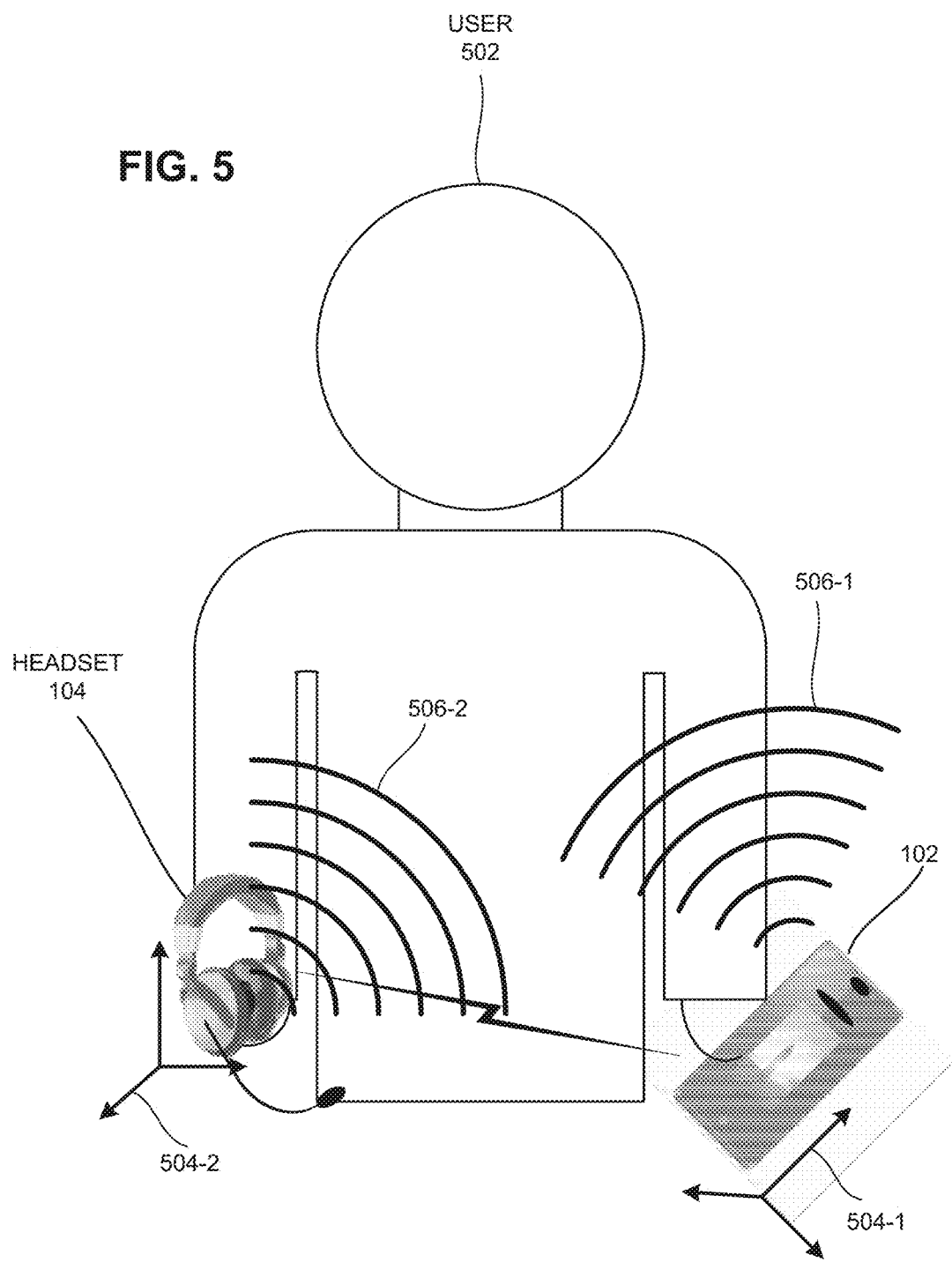
FIG. 5 illustrates exemplary operation of the user device of FIG. 1.

FIG. 5 illustrates exemplary operation of user device 102. As shown, user device 102 and peripheral device 104, which may be paired with user device 102, may be in proximity of user 502.

User device 102 and peripheral device 104 may be in a specific physical orientation, as illustrated by the local frame of reference 504-1 for user device 102 and the local frame of reference 504-2 for peripheral device 104. User device 102 and peripheral device 104 may sense its orientation, and therefore, the orientations of their frames of reference 504. Their orientation information may be provided to user device 102.

In addition, user device 102 and peripheral device 104 may detect their own movements. For example, when user 502 moves either user device 102 or peripheral device 104, user device 102 may detect the movement.

As discussed above, both user device 102 and peripheral device 104 may sense their proximity to user 502, via sensor outputs 506-1 and 506-2. Thus, when user 502 moves peripheral device 104 toward the user's head, user device 102 may receive images captured by peripheral device 104, infrared sensor input/output of peripheral device 104, and/or acoustical input/output of peripheral device 104. Based on the image and sensor information from peripheral device 104, user device 102 may determine that peripheral device 104 is in the proximity of user 502. In some implementations, peripheral device 104 may include sensors that sense its contact with user's head.

When user device 104 determines that peripheral device 104 is on user 502's head, user device 102 may direct audio I/O to peripheral device 104. Similarly, when device 102 determines that user device 102 is moving toward the user's head, user device 102 may redirect the audio I/O to user device 102 itself.

In some implementations, reconfiguring the audio I/O may be performed only when there is an incoming call or an outbound call. In such implementations, merely moving peripheral device 104 toward user 502's head would not result in user device 102 redirecting the audio I/O to peripheral device 104. User device 102 would need to detect both an incoming call as well as the movement of peripheral device 104 (alternatively, detect user 502 wearing peripheral device 104 on the user's head).

Depending on the area/locale in which user device 102 is located, user device 102 may apply different logic to direct its audio I/O. For example, assume that user device 102 is inside a car or at another location, in which user device 102 is paired with a microphone and speakers associated with the locale. When user device 102 detects that user device 102 or peripheral device 104 is moving toward the user's head/ears (or is at the user's head or ears), user device 102 may redirect its audio I/O from the microphone/speakers associated with the locale to the microphone/speakers of either user device 102 or peripheral device 104.

In FIG. 5, user device 102 may reconfigure or redirect its audio I/O when event detector 402 in user device 102 detects an event that comprises occurrences of a specific set of values for user device state variables. Thus, the detection of the event involves detecting parameter values for the state variables. The manner in which user device 102 detects such parameter values depends on its implementation.

For example, in one implementation, event detector 402 may include hard-coded sequence of detection modules. Each module may detect a specific set of states for redirecting audio I/O. In a different implementation, event detector 402 may perform a lookup of different sets of state parameters in a table of events.

FIGS. 6A and 6B illustrate an exemplary table 600 of events. As shown, table 600 includes 6 records, 602-1 through 602-6 (collectively "records 602" and generically "record 602"). Each record 602 corresponds to an event that occurs when a set of state variable values attain specific values provided in the record 602.

As shown, record 602-1 may include record number field 606-1, device field 608-1, relative location field 610-1, ambient noise field 612-1, direction field 614-1, gesture field 616-1, call-type field 618-1, contact type field 620-1, paired devices field 622-1, and action field 624-1. Other records 602-2 through 602-6 may include the same type of fields as record 602-1. Each of the fields 608 through 622 and its value correspond to a state variable of user device 102 and the value that the state variable has to attain, for an event corresponding to the record to occur. Accordingly, when the values of state variables of user device 102 match the values of the corresponding fields 608-622 in a record 602, event detector 404 may notify output control logic 408 of the event. Thereupon, output control logic 408 may perform the action(s) specified in action field 624 of the record 602.

Record number field 606 stores a value (e.g., string, number, etc.) that identifies the record in which target state variable values are stored. Device field 608 includes an identifier for a device whose motion or input is required for the event identified by record number field 606 to occur. Relative location field 610 identifies the relative location of the device in an event corresponding to record 602. Ambient noise level field 612 specifies the ambient noise level of an event corresponding to record 602.

Direction field 614-1 indicates the direction of movement of the device identified by device field 608 (if there is a movement). Gesture field 616-1 indicates the type of gesture or movement associated with the device identified by device field 608. The gesture may include, for example, dialing a number on the device, holding and moving the device, etc.

Call type field 618 may indicate whether a call in an event corresponding to record 602 is an incoming call or an outgoing call. Contact type field 620 may identify whether the party with whom the user communicates is "private" (the user does not want another to overhear—herein also referred to as PRIVATE) or "public" (the user does not care whether another overhears the phone conversation—herein also referred to as PUBLIC).

Paired devices field 622 may indicate the devices that are paired at the start of the event (e.g., user device 102 and peripheral device 104). Action field 624 may specify the actions that user device 102 is to take when the event occurs (e.g., the states of user device 102 (and devices with which user device 102 is paired) match the values specified in fields 608 through 622).

Record 602-1 specifies the following conditions/states: there is an incoming call from a PUBLIC party; and the user holds device D1 and moves device D1 toward the user's head (see direction field 614-1). Device D1 is paired with device D2. Upon detecting the occurrence of these conditions, D1 or D2 directs the audio I/O to D1, as indicated by field 624-1. If D1 and D2 represent user device 102 and peripheral device 104, respectively, the audio I/O is directed to the microphone and speakers of user device 102. Similarly, if D1 and D2 represent peripheral device 104 and user device 102, the audio I/O is directed to microphone and speakers of peripheral device 104 (e.g., headset).

Record 602-2 specifies the following conditions/states: there is an incoming call from a PUBLIC party; and the user holds device D1 and moves device D1 away from the user's head (see direction field 614-2). Device D1 is paired with device D2. Upon detecting the occurrence of these conditions, D1 or D2 directs the audio I/O to D2. If D1 and D2 represent peripheral device 104 and user device 102, respectively, the audio I/O is directed to the microphone and speakers of user device 102. Similarly, if D1 and D2 represent user device 102 and peripheral device 104, the audio I/O is directed to microphone and speakers of peripheral device 104.

Record 602-3 specifies the following conditions/states: there is an incoming call from a PRIVATE party; and the user inside a car holds device D1 and moves device D1 toward the user's head (see direction field 614-3). Either D1 or D2 is paired with D3. Upon detecting the occurrence of these conditions, D1 or D2 decouples its audio I/O from device D3 and directs its audio I/O to D1. If D1, D2, and D3 represent user device 102, peripheral device 104, and a hands-free device (e.g., a BLUETOOTH enabled device in the car), respectively, user device 102 is unpaired or decoupled from the hands free device, and its audio I/O is directed to the microphone and speakers of user device 102. Similarly, if D1, D2, and D3 represent peripheral device 104, user device 102, and the hands-free device, user device 102 is uncoupled/unpaired from the hands free device, and its audio I/O is directed to microphone and speakers of peripheral device 104.

Record 602-4 specifies the following conditions/states: there is an incoming call from a PUBLIC party; and the user inside a car holds device D1 and moves device D1 away from the user's head (see direction field 614-4). D1 is not paired with any other device. Upon detecting the occurrence of these conditions, D1 pairs with D3 and directs its audio I/O to D3. If D1, D2, and D3 represent user device 102, peripheral device 104, and the hands-free device, respectively, user device 102 pairs with the hands-free device and directs its audio I/O to the microphone and speakers of the hands-free device.

Record 602-5 specifies the following conditions/states: there is an incoming call from a PUBLIC party; and the user inside a car holds device D1 and moves device D2 away the user's head (see direction field 614-5). D1 is paired with D2. Upon detecting the occurrence of these conditions, D1 decouples its audio I/O from D2 and directs its audio I/O to D3. If D1, D2, and D3 represent user device 102, peripheral device 104, and the hands-free device, respectively, user device 102 decouples from peripheral device 104, and couples to the hands free device. User device 102 also directs its audio I/O to the microphone and speakers of the hands free device.

Record 602-6 specifies the following conditions/states: the user begins to dial a number to make an outgoing call. In such an instance, if the user has not completed the dialing and the number being dialed matches a unique entry in the contact list/address book in D1, then D1 may automatically complete the dialing. D1 may also direct its audio I/O to its microphone and speakers.

In FIGS. 6A and 6B, table 600 is depicted as including records 602-1 through 602-6, which depict six exemplary types of events. Depending on the implementation, table 600 may include additional, fewer, or a different number of records. In addition, depending on the implementation, each of the records may include additional, fewer, or different fields/values than those illustrated in FIGS. 6A and 6B. For example, in some implementations, record 602 may not include ambient noise field 612-1, contact type field 620 (e.g., public or private call type distinction). In another example, record 602 may include a field that indicates whether a particular device is being worn on the user's head. For these implementations, the audio I/O may be rerouted with/without the information from the added/omitted fields.

In yet another example, record 602 may include a field that indicates whether the power level of a particular device is low. In such an instance, when a user holds a device (e.g., headset) whose power is low, user device 102 would detect the low power, and direct the audio I/O to user device 102. If user device 102 is inside a a car and/or is already coupled with hands-free device, user device 102 may direct the audio I/O to the hands-free device.

EXEMPLARY PROCESSES

Figure 7:
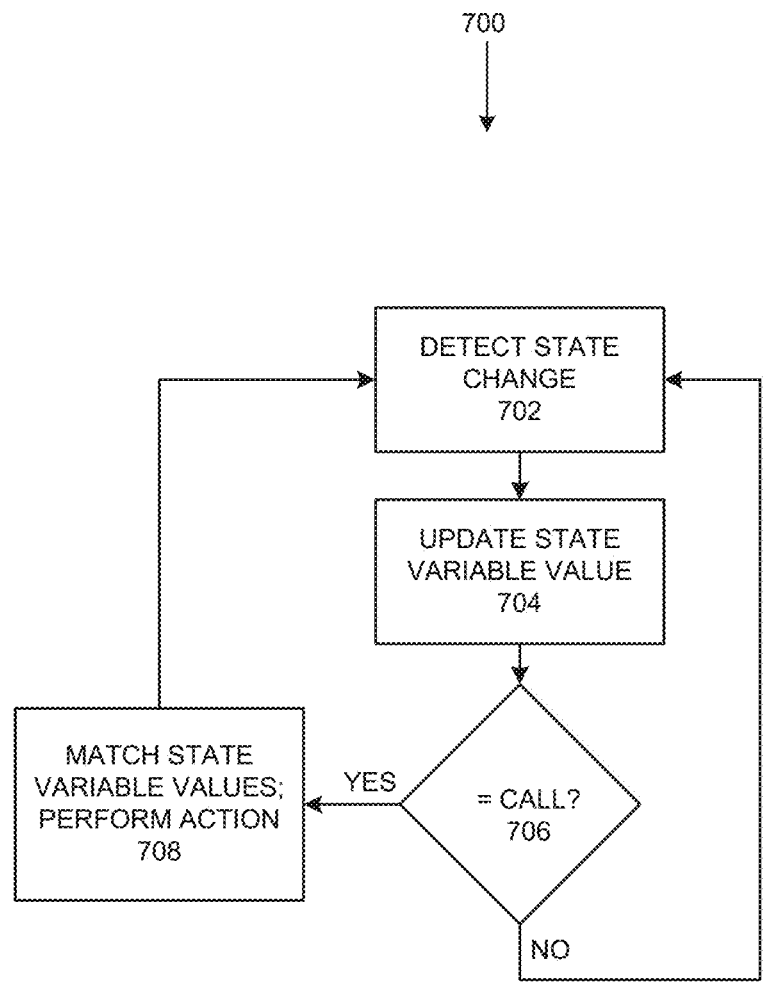
FIG. 7 is a flow diagram of an exemplary process that is associated with the user device of FIG. 1.

FIG. 7 is a flow diagram of an exemplary process 700 that is associated with user device 102. As shown, process 700 may include detecting a change in state (block 702). Detecting a state change may include detecting a change in state variable values of user device 102, peripheral device 104, and/or another device. As already discussed, the states may relate to ambient noise, the location of user device 102 and/or peripheral device, a direction, a gesture, etc.

In some implementations, user device 102 may include a table for tracking the current values of the state variables/parameters. Upon detecting the state change (block 702), user device 102 may update the state table with the latest state/parameter value (block 704).

User device 102 may determine if the state change includes an occurrence of an incoming/outgoing call (e.g., the user begins to dial a number; or there is an incoming call) (block 706). If the state change does not involve a call (block 706: no), process 700 may return to block 702, to monitor further changes in the values of the state variables. Otherwise (block 706: yes), process 700 may proceed to block 708.

At block 708, user device 102 may match the values, of its state variables, recorded in the table, to those in records of table 600. When there is a match between values recorded in the table to the values in a record 602, user device 102 may determine that the event associated with the record 602 is detected. Thereafter, user device 102 may perform the actions that are specified in action field 624 of the record 602.

In other implementations, user device 102 may detect the occurrence of an event in accordance with a process that detects, in effect, state transitions. In such implementation, when a state change occurs, user device 102 shifts from one state to another state.

In such implementations, the values of the state variables are recorded in a table/list, as in process 700. However, user device 102 also tracks, for each of the possible combinations of state values, a set of possible state transitions (due to a change in a state variable value) and actions associated with its arrival at the new state.

Figure 8:
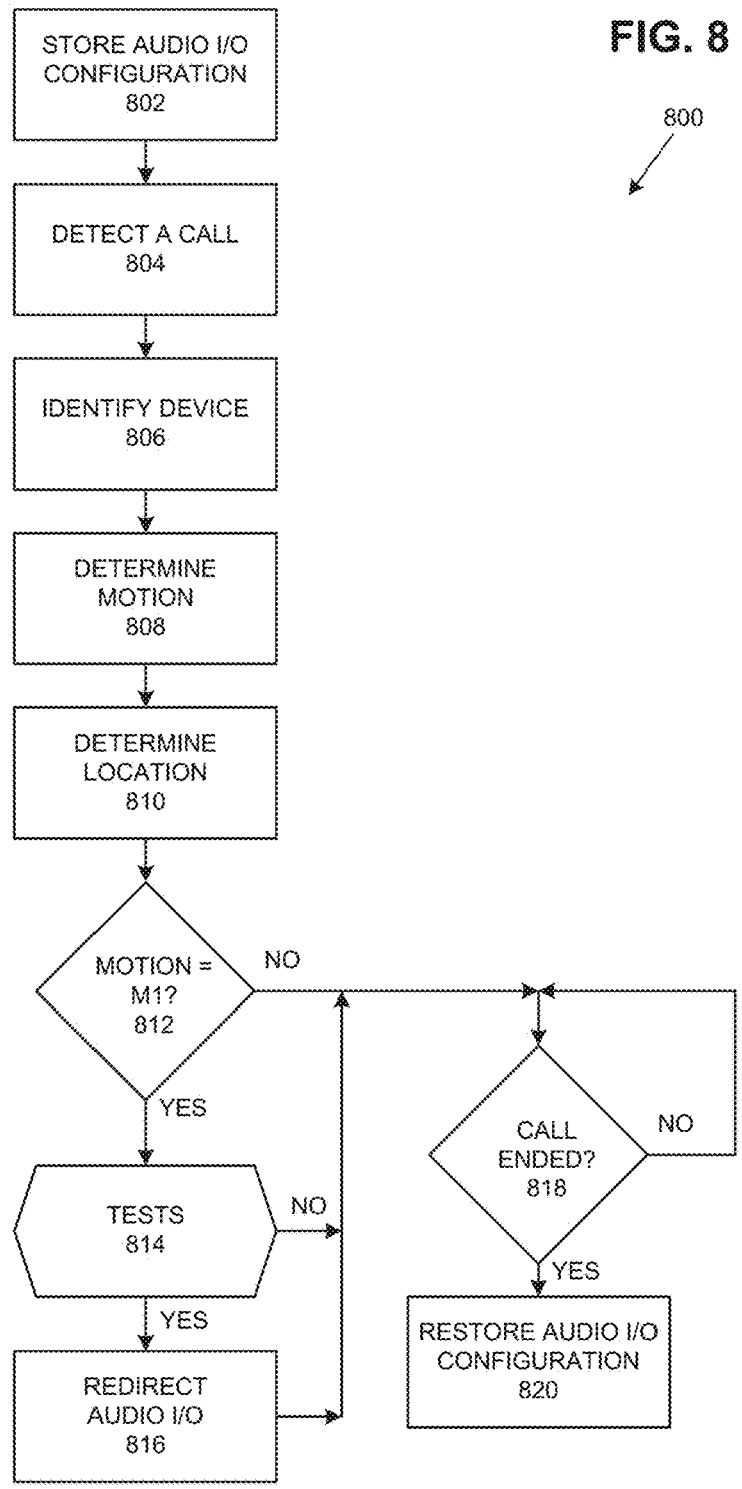
FIG. 8 is a flow diagram of another exemplary process that is associated with the user device of FIG. 1.

FIG. 8 is a flow diagram of another exemplary process 800 that is associated with the user device of FIG. 1. As shown, process 800 may include storing audio I/O configuration (block 802). Storing the audio I/O configuration may include, for example, storing the identifier of a device to which user device 102 is coupled/paired.

User device 102 may detect an occurrence of a call (block 804). For example, user device 102 may detect a call from remote device or detect the user dialing via a keypad on user device 102.

User device 102 may detect a device that is receiving input or is moving (block 806). For example, user device 102 may detect whether the user is moving peripheral device 104 or is inputting phone number into user device 102.

User device 102 may detect a user's gesture or motion (block 808). Depending on the implementation, the time window for detecting the motion/gesture may bracket or encompass the time of the detection of the call. When a motion/gesture is completed within the specified time window, user device 102 may determine that the motion/gesture is detected.

User device 102 may detect the gesture/motion in many different ways. For example, in one implementation, user device 102 may receive a signal from peripheral device 104 that includes a gyroscope/accelerometer/compass. When the user moves peripheral device 104, peripheral device 104 may send motion/orientation-related information to user device 102. In other implementations, peripheral device 104 may be implemented as a headset that includes either piezoelectric or mechanical components to detect whether peripheral device 104 is being worn on the user's head. Peripheral device 104 may send information relating such detection to user device 102. In addition, user device 104 may itself include components for detecting its own motion and/or user input. As described above, such components may include accelerometer, compass, gyroscope, proximity sensors, a camera, soft-keys (for detecting numerical input), etc.

User device 102 may determine its physical location (block 810). Depending on the implementation, user device 102 may use Global Positioning System (GPS) receiver, information from base stations, and/or other means for determining its location.

User device 102 may determine whether detected gesture/motion is one of the pre-defined gestures/motions necessary for events to occur (block 812). If the detected motion is not one of the specified motions (block 812: no), process 800 may proceed to block 818. Otherwise (block 812: yes), process may proceed to block 814.

User device 102 may test or determine whether values of other state variables are equal to specified values required for the event (block 814). For example, user device 102 may test or determine whether ambient noise is present, whether the incoming call is from a PRIVATE party, etc. In another example, user device 102 may test/determine whether the call is an incoming call or outbound call. If any of the values is not equal to the corresponding, specified value (block 814: no), user device 102 may proceed to block 818.

If all of the values are equal to the corresponding specified values (block 814: yes), user device 102 may redirect its audio I/O (block 816). For example, assuming that user device 102 is within an automobile, user device 102 may pair with the hands-free device within the car and direct its audio I/O to the hands-free device.

User device 102 may determine if the call has ended/terminated (block 818). If the call has not terminated (block 818: no), user device 102 may continue to monitor its call state at block 818. Otherwise (block 818: yes), user device 818 may proceed to block 820, to restore the audio I/O configuration that was stored at block 802.

In a different implementation, rather than detecting that the call is terminated, user device 102 may continue to detect changes in its state and take further actions in accordance with the detected state. For example, user device 102 may restore the audio I/O configuration not when user terminates a call, but when the user moves user device 102 away from his head.

EXAMPLE

The following exemplary scenario is described with reference to records 602-1 and 602-3 in FIG. 6A. Assume that Johan owns a primary device (e.g., a mobile phone; D1 in record 602-1), which is BLUETOOTH paired with another device (e.g., a headset or hands-free device; D2 in record 602-1). The audio I/O of the primary device D1 is directed to the secondary device D2, by the virtue of the secondary device's coupling to the primary device D1. Also assume that, for this example, the primary device D1 does not use the status of the caller as PRIVATE or PUBLIC in the contact list to redirect its audio I/O.

Assume that the primary device detects an incoming call (call type fields 618-1). Johan may or may not answer the call at this point. In either case, Johan realizes that the battery is low on the secondary device D2 or that the call is private. Hence, Johan makes a gesture (e.g., moves the primary device D1 toward Johan's head) (gesture field 616-1 and direction field 616-1). Upon detection of the gesture via its sensors (as well as detection of other conditions in table 600), the primary device D1 directs the audio I/O to the speakers and microphone of the primary device D1 (action fields 624-1, indicating the rerouting of the audio I/O to D1). Johan then speaks to the caller via the primary device D1.

When Johan terminates the call or moves the primary device away from his head, the primary device D1 redirects the audio I/O to the secondary device D2 (e.g., restore its original audio I/O configuration).

CONCLUSION

As described above, user device 102 may detect a user's gesture or motion. If the gesture/motion indicates that the user is about to use a peripheral device (e.g., headset), user device itself 102, or another device, user device 102 may direct its audio input/output to the device about to be used. User device 102 may determine which device is about to be used based on different state variables associated with user device 102, peripheral device, and/or another device.

The foregoing description of implementations provides illustration, but is not intended to be exhaustive or to limit the implementations to the precise form disclosed. Modifications and variations are possible in light of the above teachings or may be acquired from practice of the teachings.

For example, in some implementations, peripheral device 104 may include a display (e.g., display glasses). In such implementations, user device 102, instead of just redirecting audio I/O, may redirect audio-visual I/O. Peripheral device 104 and/or hands-free device coupled with user device 102 may exchange multi-media input/output.

In another example, in this specification, while series of blocks have been described with regard to different processes, the order of the blocks in the processes may be modified in other implementations. In addition, non-dependent blocks may represent blocks that can be performed in parallel. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A first device operable to be paired with a second device, the first device comprising:
   a memory to store instructions and call event records, each call event record recording:
      i) a specific combination of states relating to at least one of the first device or the second device during a call associated with the call event record, the combination of states comprising a user gesture related to the call, and contact information of a called or calling party related to the call, wherein the contact information comprises a contact type that specifies whether the called or calling party is private or public, and
      ii) an action specifying audio input and output direction;
   a processor configured to execute the instructions to:
      monitor each state of the combination of states of the first device or the second device to detect changes in the monitored states of the first device or the second device;
      detect an incoming call to the first device or an outbound call from the first device;
      identify one of the stored call event records that matches a call event record having the combination of states of the first device or second device at detection of the incoming call or the outbound call, including the user gesture and contact type relating to the incoming call or the outbound call; and
      perform the action associated with the identified event record including directing audio input and output in accordance with the specified direction recorded in the associated action.

2. The first device of claim 1, wherein the first device includes one of:
   a smart phone; a tablet computer; a computer; a laptop computer, and
   wherein the second device includes one or more of:
      a headset; speakers; a microphone; or a head-mounted display.

3. The first device of claim 1, wherein the processor is further configured to:
   detect initial digits of a phone number being input to the first device.

4. The first device of claim 1, further comprising a component that includes at least one of:
   an accelerometer, a camera, a compass, a proximity sensor, and a gyroscope,
   wherein when the processor monitors the states of the first device, the processor receives and processes output of the component.

5. The first device of claim 1, wherein the second device further comprises a component that includes at least one of:
   an accelerometer;
   a camera;
   a proximity sensor;
   a sensor for determining whether the second device is being worn on a user's head; and
   a gyroscope,
   wherein when the processor monitors the states of the second device, the processor receives and processes output of the component.

6. The first device of claim 1, wherein the user gesture includes moving the second device to the head of the user,
   wherein when the processor directs the audio input and output in accordance with the specified direction recorded in the associated action, the processor directs the audio input and output to the second device.

7. The first device of claim 1, wherein the user gesture includes moving the first device to the head of the user,
   wherein when the processor directs the audio input and output in accordance with the specified direction recorded in the associated action, the processor directs the audio input and output to the first device.

8. The first device of claim 1, wherein the user gesture includes moving the first device away from the head of the user, and
   wherein when the processor directs the audio input and output in accordance with the specified direction recorded in the associated action, the processor redirects the audio input and output to the second device.

9. The first device of claim 1, wherein the user gesture includes moving the first device toward the head of the user and the first device is paired with a third device, and
   when the processor directs the audio input and output in accordance with the specified direction recorded in the associated action, the processor:

causes the first device to decouple from the third device; and directs the audio input and output to the first device.

10. The first device of claim 1, wherein the user gesture includes moving the second device toward the head of the user and the first device is paired with a third device, and when the processor directs the audio input and output in accordance with the specified direction recorded in the associated action, the processor:

causes the first device to decouple from the third device;

pairs the first device with the second device; and directs the audio input and output to the second device.

11. The first device of claim 1, wherein the user gesture includes moving the second device away the head of the user and the first device is paired with the second device, and when the processor directs the audio input and output in accordance with the specified direction recorded in the associated action, the processor:

causes the first device to decouple from the second device;

pairs the first device with the third device; and directs the audio input and output to a third device.

12. The first device of claim 1, wherein the user gesture includes dialing a portion of a phone number, and when the processor directs the audio input and output in accordance with the specified direction recorded in the associated action, the processor:

completes the dialing of the phone number; and initiates a call based on the dialed number.

13. A method comprising:

storing call event records in a memory of a first device, each call event record recording:

i) a specific combination of states relating to at least one of the first device or a second device during a call associated with the call event record, the combination of states comprising a user gesture related to the call and contact information of a called or calling party related to the call, wherein the contact information comprises a contact type that specifies whether the called or calling party is private or public, and ii) an action specifying audio input and output direction;

monitoring each state of the combination of states of the first device or the second device to detect changes in the monitored states of the first device or the second device;

detecting an incoming call to the first device or an outbound call from the first device;

identifying one of the stored call event records that matches a call event record having the combination of states of the first device or second device at detection of the incoming call or the outbound call, including the user gesture and contact type relating to the incoming call or the outbound call; and performing the action associated with the identified event record including directing audio input and output in accordance with the specified direction recorded in the associated action.

14. The method of claim 13, wherein the user gesture includes moving the second device to the head of the user, wherein the directing the audio input and output in accordance with the specified direction recorded in the associated action includes directing the audio input and output to the second device.

15. The method of claim 13, wherein the user gesture includes moving the first device to the head of the user, wherein the directing the audio input and output in accordance with the specified direction recorded in the associated action includes directing the audio input and output to the first device.

16. The method of claim 13, wherein the user gesture includes moving the first device away from the head of the user, and wherein the directing the audio input and output in accordance with the specified direction recorded in the associated action includes directing the audio input and output to the second device.

17. The method of claim 13, wherein the user gesture includes moving the first device toward the head of the user, wherein the directing the audio input and output in accordance with the specified direction recorded in the associated action includes:

causing the first device to decouple from a third device; and directing the audio input and output to the first device.

18. The method of claim 13, wherein the user gesture includes moving the second device toward the head of the user, and wherein the directing the audio input and output in accordance with the specified direction recorded in the associated action includes:

causing the first device to decouple from a third device;

pairing the first device with the second device; and directing the audio input and output to the second device.

19. The method of claim 13, wherein the user gesture includes moving the second device away the head of the user, wherein the first device is paired with the second device, and wherein the directing the audio input and output in accordance with the specified direction recorded in the associated action includes:

causing the first device to decouple from the second device;

pairing the first device with a third device; and directing the audio input and output to the third device.

20. The method of claim 13, wherein the user gesture includes dialing a portion of a phone number, wherein the directing the audio input and output in accordance with the specified direction recorded in the associated action includes:

completing the dialing of the phone number; and initiating a call based on the dialed number.

21. The first device of claim 1, wherein another of the states of the specific combination of states of the first device or second device is a low power state, wherein the monitoring states of the first device and the second device includes monitoring the low power state, and wherein the identifying one of the event records associated with the specific combination of states of the first device or second device, the specific combination of states including the monitored low power state.

22. The first device of claim 1, wherein each combination of states further comprises an ambient noise level field, wherein identifying one of the stored call event records that matches a call event record having the combination of states at detection of the incoming call or the outbound call further includes the ambient noise level relating to the incoming call or the outbound call.

* * * * *